(12) United States Patent
Wei et al.

(10) Patent No.: US 12,348,890 B2
(45) Date of Patent: Jul. 1, 2025

(54) SEAMLESS VIDEO SWITCHING METHOD AND SYSTEM IN VIDEO MATRIX

(71) Applicant: Guangdong Baolun Electronics Co., Ltd., Guangdong (CN)

(72) Inventors: Chun Wei, Guangdong (CN); Changlv Li, Guangdong (CN); Changhua Zhang, Guangdong (CN); Zhenghui Zhu, Guangdong (CN); Dingjin Zhao, Guangdong (CN)

(73) Assignee: GUANGDONG BAOLUN ELECTRONICS CO., LTD., Guangdong (CN)

( * ) Notice: Subject to any disclaimer, the term of this patent is extended or adjusted under 35 U.S.C. 154(b) by 22 days.

(21) Appl. No.: 18/417,802

(22) Filed: Jan. 19, 2024

(65) Prior Publication Data

US 2024/0205360 A1    Jun. 20, 2024

Related U.S. Application Data

(63) Continuation of application No. PCT/CN2021/122615, filed on Oct. 8, 2021.

(30) Foreign Application Priority Data

Jul. 29, 2021    (CN) .......................... 202110869298.X

(51) Int. Cl.
*H04N 5/268*    (2006.01)
*H04N 5/91*    (2006.01)

(52) U.S. Cl.
CPC .............. *H04N 5/268* (2013.01); *H04N 5/91* (2013.01)

(58) Field of Classification Search
CPC ................................ H04N 5/268; H04N 5/91
See application file for complete search history.

(56) References Cited

U.S. PATENT DOCUMENTS 5,732,182 A * 3/1998 Masuda ................... H04N 5/91
  386/300
8,175,298 B2 * 5/2012 Mitani ..................... H04N 5/60
  381/74

(Continued)

FOREIGN PATENT DOCUMENTS

CN    107390893 A    11/2017
CN    110855909 A    2/2020

*Primary Examiner* — Michael B. Pierorazio
(74) *Attorney, Agent, or Firm* — MUNCY, GEISSLER, OLDS & LOWE, P.C.

(57) ABSTRACT

A method and seamless video switching method and system in video matrix. The method includes dividing a memory address on a memory for storing video data into several memory spaces; and reading and writing the video data normally under the condition that no video switching instruction is received; or executing steps as follows: enabling, during a period when the video switching instruction keeps valid, a write control module to skip back to a head address of a memory space currently written to write a frame of image in video data of a target channel after switching into the current memory space; and enabling a read control module to skip back to a head address of a memory space currently read to read a frame of image from the current memory space until the video switching instruction is invalid.

15 Claims, 1 Drawing Sheet

(56) References Cited

U.S. PATENT DOCUMENTS

| | | | | |
|---|---|---|---|---|
| 8,201,211 B2* | 6/2012 | Proust | G06F 21/575 | 707/999.203 |
| 8,351,624 B2* | 1/2013 | Motomura | H04N 21/43635 | 348/706 |
| 8,838,911 B1* | 9/2014 | Hubin | G11B 20/10527 | 711/147 |
| 10,051,204 B2* | 8/2018 | Gopinath | H04N 5/268 | |
| 2006/0161958 A1* | 7/2006 | Choung | H04N 21/4122 | 725/78 |
| 2007/0046835 A1* | 3/2007 | Kim | H04N 21/42204 | 348/731 |
| 2007/0076123 A1* | 4/2007 | Ogilvie | G06T 1/20 | 348/E5.057 |
| 2008/0063216 A1* | 3/2008 | Sakata | H04S 3/008 | 381/80 |
| 2008/0066119 A1* | 3/2008 | Schieltz | H04N 5/268 | 348/E5.057 |
| 2008/0309830 A1* | 12/2008 | Motomura | H04N 21/43635 | 348/E5.122 |
| 2008/0320545 A1* | 12/2008 | Schwartz | H04N 7/17318 | 725/135 |
| 2010/0215347 A1* | 8/2010 | Ikeda | H04N 13/161 | 386/212 |
| 2010/0315553 A1* | 12/2010 | Takatsuji | G06F 21/10 | 348/E9.034 |
| 2010/0321479 A1* | 12/2010 | Yang | H04N 21/816 | 348/51 |
| 2011/0051002 A1* | 3/2011 | Oh | H04N 5/765 | 348/569 |
| 2011/0068736 A1* | 3/2011 | Chartier | H02J 7/00 | 320/137 |
| 2011/0113442 A1* | 5/2011 | Kikkawa | G09G 5/006 | 725/25 |
| 2011/0134338 A1* | 6/2011 | Toba | H04N 5/765 | 348/734 |
| 2011/0142245 A1* | 6/2011 | Toba | G11B 20/10527 | 381/22 |
| 2011/0176057 A1* | 7/2011 | Okamura | H04N 21/439 | 348/554 |
| 2011/0234916 A1* | 9/2011 | Fujita | H04N 5/60 | 348/E5.122 |
| 2012/0002562 A1* | 1/2012 | Kawade | H04N 5/765 | 370/252 |
| 2012/0030728 A1* | 2/2012 | Yukawa | G06F 9/44 | 725/151 |
| 2012/0042346 A1* | 2/2012 | Yoshida | H04N 21/4363 | 725/81 |
| 2012/0136612 A1* | 5/2012 | Vanderhoff | H04N 17/004 | 702/119 |
| 2012/0188456 A1* | 7/2012 | Kuroyanagi | H04N 5/765 | 348/731 |
| 2012/0307157 A1* | 12/2012 | Utsunomiya | H04N 21/43622 | 348/707 |
| 2013/0021536 A1* | 1/2013 | Kamida | H04N 21/43622 | 348/739 |
| 2013/0051578 A1* | 2/2013 | Chu | H04B 1/123 | 381/94.1 |
| 2013/0051584 A1* | 2/2013 | Higuchi | H04N 21/4363 | 381/123 |
| 2013/0223538 A1* | 8/2013 | Wang | H04N 21/43637 | 375/E7.027 |
| 2013/0292311 A1* | 11/2013 | Shaw | E03F 5/042 | 137/15.01 |
| 2014/0193134 A1* | 7/2014 | Maeda | H04N 21/43072 | 386/231 |
| 2015/0077633 A1* | 3/2015 | Lee | H04N 21/4392 | 348/515 |
| 2020/0068139 A1* | 2/2020 | Gopinath | H04N 21/4135 | |

* cited by examiner

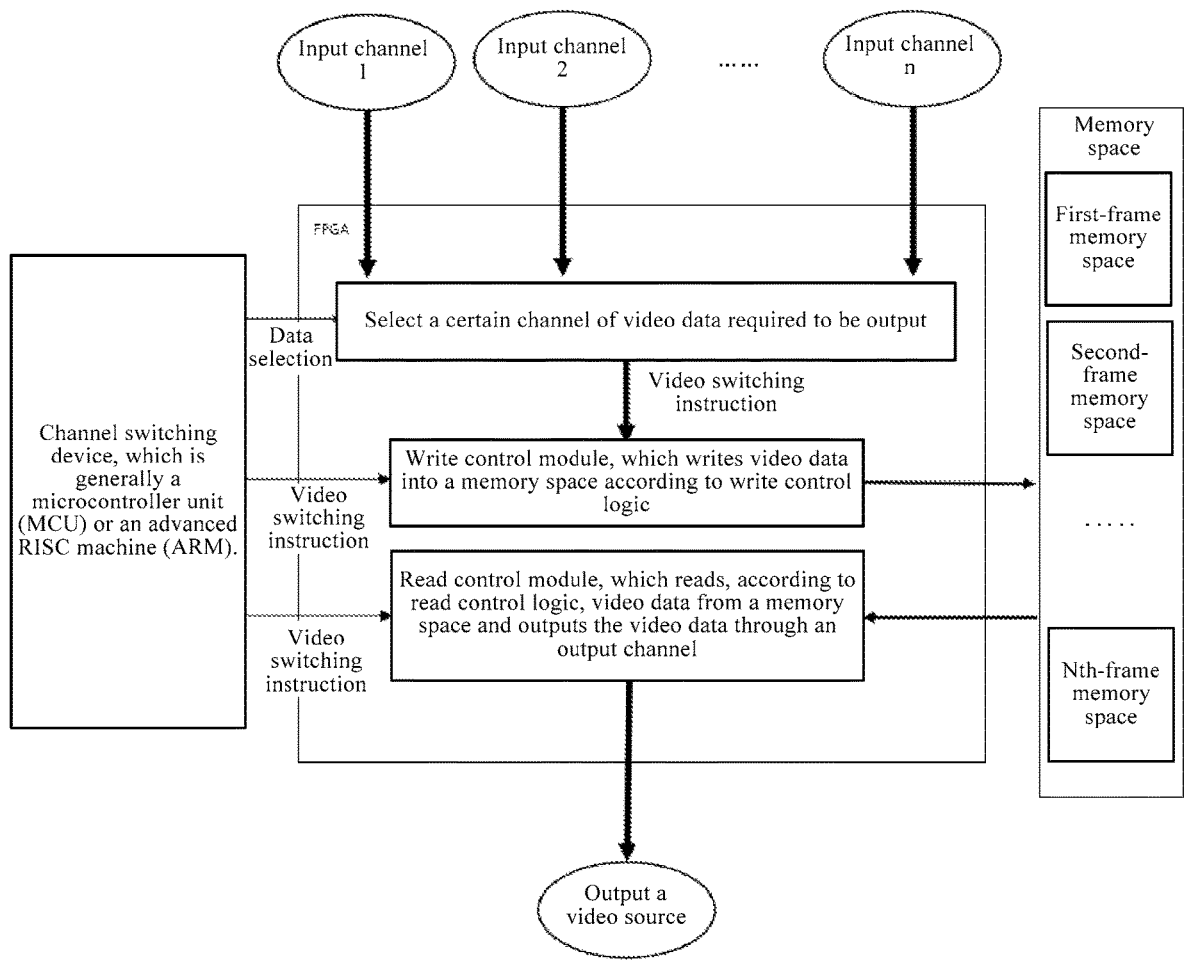

SEAMLESS VIDEO SWITCHING METHOD AND SYSTEM IN VIDEO MATRIX

CROSS REFERENCE TO RELATED APPLICATIONS

This application is a Continuation of the U.S. National Stage of International Application No. PCT/CN2021/122615 filed on Oct. 8, 2021, which claims priority to Chinese Patent Application No. 202110869298.X on filed Jul. 29, 2021 under 35 U.S.C. § 119; the entire contents of all of which are hereby incorporated by reference.

TECHNICAL FIELD

The present application relates to the field of video switching technologies, and particularly relates to seamless video switching method and system in video matrix.

BACKGROUND

In plenty of video scenes required to be applied, video sources are required to be input or output through multiple channels. That is, a video matrix is required. Different video sources can be input through each of multiple channels in the video matrix, and different video sources can be output through each of multiple channels in the video matrix. The video in any input channel can be output through any output channel in the video matrix. Moreover, video switching is involved in this process. Specifically, a video source of a current input channel is switched to an input source of another input channel to be output. For example, a video source currently output through output channel a is video source c1 of input channel b1, and it is required to switch the video source output through output channel a to video source c2 of input channel b2. That is, video source c1 of input channel b1 is switched to video source c2 of input channel b2, so video switching is completed.

An existing video switching technology generally has one or more defects including temporary black screen, image tearing, temporary image freezing and the like during switching. Thus, a video switching effect is reduced and user experience is affected. Image tearing is especially likely to appear during video switching, which extremely affects user experience. Image tearing means that during switching, an image output by the video matrix should be a complete frame of image, but two or more image frames are mixed to be output or only a half image frame is output. Therefore, a processing method capable of avoiding image tearing during video switching is required to avoid this situation.

SUMMARY

In order to overcome defects in the prior art, a first objective of the present application is to provide a seamless video switching method in video matrix, which can solve the problem of image tearing during video switching.

A second objective of the present application is to provide a seamless video switching system in video matrix, which can solve the problem of image tearing during video switching.

A technical solution for realizing the first objective of the present application is as follows:
a seamless video switching method in video matrix includes steps as follows:

step 1: dividing a memory address on a memory for storing video data into several memory spaces, where each memory space includes several memory addresses;

step 2: executing step 3 under the condition that a controller does not receive a video switching instruction; or executing step 4, where the video switching instruction includes target channel information, and the target channel information includes a target input channel and a target output channel;

step 3: enabling a write control module in the controller to receive video data of a current input channel and write the video data into the memory according to an image frame, where a frame of image is correspondingly stored in a memory space in the memory; enabling a read control module in the controller to read the image frame in the memory and output the image frame in a current output channel; enabling the write control module to write a next complete frame of image into a next memory space every time a complete frame of image is written; and enabling the read control module to read a complete frame of image into a next memory space after a complete frame of image of a current memory space is read; where a read-write sequence in which the write control module writes the video data into the memory and the read control module read the video data from the memory conforms to preset rule 1;

preset rule 1 is as follows: after the read control module and the write control module start reading and writing, in a memory address sequence, the read control module starts reading video data after the write control module writes at least a complete frame of image, and the read control module starts reading a next frame of image every time the write control module writes a complete frame of image; and the write control module starts writing a next complete frame of image every time the read control module reads a complete frame of image, such that the write control module and the read control module keep orderly synchronously reading and writing; and step 4: enabling, during a period when the video switching instruction keeps valid, the write control module to skip back to a head address of a memory space currently written to write a frame of image in video data of a target input channel after switching into the current memory space; enabling a read control module to skip back to a head address of a memory space currently read to read a frame of image from the current memory space and output an image frame to a target output channel until the video switching instruction is invalid; and enabling the write control module and the read control module to turn to respective next memory spaces to continue to write and read next image frames.

Further, the memory is a random access memory (RAM) or a read only memory (ROM).

Further, memory addresses of any two adjacent memory spaces are spaced by at least one memory address, such that the memory addresses of any two adjacent memory spaces are discontinuous.

Further, the video switching instruction is sent out by a channel switching device.

Further, time when the video switching instruction keeps valid equals duration occupied by several frames of images.

Further, the time when the video switching instruction keeps valid equals duration occupied by 2 frames of images.

Further, the time when the video switching instruction keeps valid lasts for 0.033 s.

Further, the video switching instruction is a level signal, and the situation that the video switching instruction keeps valid means that the video switching instruction is at a high level.

A technical solution for realizing the second objective of the present application is as follows: a seamless video switching system in video matrix includes a controller, a memory and a channel switching device. The memory and the channel switching device are electrically connected to the controller.

The memory is configured to receive image frames output by the controller through an output channel, the same frame of images are stored in one memory space, and different frames of images are stored in different memory spaces.

The channel switching device is configured to send a video switching instruction to the controller, the video switching instruction includes a target channel, and the target channel includes a target input channel and a target output channel.

The controller includes a read control module and a write control module, the controller is configured to receive video data input through an input channel and execute corresponding steps according to whether the video switching instruction is received, if yes, step 3 is executed, and if not, step 4 is executed.

Step 3 is as follows: enabling the write control module in the controller to receive video data of a current input channel and write the video data into the memory according to an image frame, where a frame of image is correspondingly stored in a memory space in the memory; enabling the read control module in the controller to read the image frame in the memory and output the image frame in a current output channel; enabling the write control module to write a next complete frame of image into a next memory space every time a complete frame of image is written; and enabling the read control module to read a complete frame of image into a next memory space after a complete frame of image of a current memory space is read.

A read-write sequence in which the write control module writes the video data into the memory and the read control module read the video data from the memory conforms to preset rule 1.

Preset rule 1 is as follows: after the read control module and the write control module start reading and writing, in a memory address sequence, the read control module starts reading video data after the write control module writes at least a complete frame of image, and the read control module starts reading a next frame of image every time the write control module writes a complete frame of image. The write control module starts writing a next complete frame of image every time the read control module reads a complete frame of image, such that the write control module and the read control module keep orderly synchronously reading and writing.

Step 4 is as follows: enabling, during a period when the video switching instruction keeps valid, the write control module to skip back to a head address of a memory space currently written to write a frame of image in video data of a target channel after switching into the current memory space; enabling the read control module to skip back to a head address of a memory space currently read to read a frame of image from the current memory space until the video switching instruction is invalid; and enabling the write control module and the read control module to turn to respective next memory spaces to continue to write and read next image frames.

Beneficial effects of the present application are as follows: during video switching, an output image is always a complete frame of image instead of a half frame of image or a plurality of frames of images of a plurality of input channels mixed, such that the problems of black screen, image tearing, etc. during switching are avoided, and smooth seamless video switching is ensured. Moreover, the time when the video switching instruction keeps valid is extreme (generally 0.033 s) such that a human eye cannot perceive image freezing, and a human feels instantaneous switching. Thus, switching is extremely smooth, and high-quality seamless video switching is achieved.

BRIEF DESCRIPTION OF THE DRAWINGS

The FIGURE is a schematic framework diagram of the present application.

DETAILED DESCRIPTION OF THE EMBODIMENTS

In order to make the objectives, technical solutions and advantages of the present application clearer, the particular examples of the present application will be further described in detail below in combination with the accompanying drawings. It can be understood that the particular examples described herein are merely used to explain the present application, rather than limit the present application. In addition, it should be noted that for the convenience of description, merely some rather than all content related to the present application is shown in the accompanying drawings. Before the exemplary examples are discussed in more detail, it should be mentioned that some exemplary examples are described as processing or methods depicted as flow diagrams. Although the flow diagrams describe the operations (or steps) as sequential processing, many of the operations can be implemented concurrently, concomitantly or simultaneously. In addition, the sequence of the operations can be reset. The processing can be terminated when the operations are complete, but there may also be additional steps not included in the accompanying drawings. The processing can correspond to methods, functions, procedures, subroutines, subprograms, etc.

With reference to the FIGURE, a seamless video switching method in video matrix includes steps as follows:

step 1: divide a memory address on a memory for storing video data into several memory spaces. The memory address is divided into N memory spaces in the FIGURE. Each memory space stores a frame of image in video data, and each memory space includes several memory addresses. A foremost memory address in the memory space is a head address, and a last memory address is a tail address. For instance, memory addresses of a first-frame memory space for storing a first frame of image in the video data are 1-10000, and include 10000 memory addresses. Memory address 1 (that is, a foremost memory address) is a head address, and memory address 10000 (that is, a last memory address) is a tail address.

The memory is generally a cache device, and may be a random access memory (RAM) or a read only memory (ROM).

In an alternative embodiment, memory addresses of any two adjacent memory spaces are spaced by at least one memory address, such that the memory addresses of any two adjacent memory spaces are discontinuous. For instance, a first-frame memory space and a second-frame memory space are two adjacent memory spaces. Memory addresses of the first-frame memory space are 1-10000, and memory addresses of the second-frame memory space are 20000-30000. A tail address of the first-frame memory space is 10000, and a head address of the second-frame memory space is 20000. Thus, the tail address of the first-frame memory space and the head address of the second-frame memory space are spaced by a plurality of memory addresses and are discontinuous. By dividing adjacent memory spaces into discontinuous memory spaces, codes for subsequently reading and writing image frames from the memory spaces have stronger readability and maintainability. The reason is that not all memory spaces each occupied by a frame of image is an integer. With a frame of image in a 1080P format as an instance, a number of bytes required to be occupied is 1920*1080*3 (red-green-blue (RGB) three-channel)=6220800 Byte, and the memory space occupied is not an integer multiple of a memory address. Therefore, the memory spaces are divided into discontinuous memory spaces, codes of which are stronger in readability and easier to maintain.

Step 2: execute step 3 under the condition that a controller does not receive a video switching instruction; or execute step 4. The video switching instruction includes target channel information, and the target channel information includes a target input channel and a target output channel. Thus, a current input channel is switched to a target input channel to receive video data, and a current output channel is switched to the target output channel to output the video data received from the target input channel. A plurality of input channels and a plurality of output channels form the video matrix.

In the step, the controller may receive the video switching instruction sent by a channel switching device for controlling video switching. The channel switching device may be a microcontroller unit (MCU), an advanced RISC machine (ARM) or other chips, and may be made into a separate module.

Step 3: enable a write control module in the controller to receive video data of a current input channel and write the video data into the memory according to an image frame. A frame of image is correspondingly stored in a memory space in the memory. Enable a read control module in the controller to read video data currently stored in the memory according to the image frame, and output the read image frame in a current output channel. Enable the write control module to write a next complete frame of image into a next memory space every time a complete frame of image is written, and so on, and continuously write new image frames until all image frames are written or the memory is full. Similarly, enable the read control module to read a complete frame of image from a next memory space every time a complete frame of image is read from a current memory space, and continuously read new image frames until all image frames are read or a read stopping instruction is received.

A read-write sequence in which the write control module writes the video data into the memory and the read control module read the video data from the memory conforms to preset rule 1.

Preset rule 1 is as follows: after the read control module and the write control module start reading and writing, in a memory address sequence, the read control module starts reading video data after the write control module writes at least a complete frame of image, and the read control module starts reading a next frame of image every time the write control module writes a complete frame of image. The write control module starts writing a next complete frame of image every time the read control module reads a complete frame of image, such that the write control module and the read control module keep orderly synchronously reading and writing. Since the write control module and the read control module keep orderly synchronously reading and writing, the read control module can be ensured to always read a complete frame of image, and a situation that an output image is a half frame of image is prevented.

It should be noted that the write control module starts writing a next frame of image every time the read control module reads a complete frame of image, which is not a causal or conditional restriction relation, but indicates coordination between the read control module and the write control module in reading and writing time. That is, the write control module just starts writing a frame of image every time the read control module reads a complete frame of image; or, the read control module just reads a frame of image every time the write control module starts writing a frame of image. The read control module and the write control module cooperate with each other in reading and writing time.

For instance, when the read control module and the write control module are powered on to start reading and writing, the write control module and the read control module generally start writing and reading from a first memory address in an ascending sequence or descending sequence of the memory addresses. Certainly, the write control module and the read control module may start reading and writing from a certain memory address in a middle. Herein, the situation of starting from the first memory address is taken as an instance. After the write control module writes a first frame of image into the first memory address, the read control module reads the first frame of image from the first memory address and outputs the first frame of image. Then, after the write control module continues to write a second frame of image into a next memory address (that is, a second memory address), the read control module reads the second frame of image from the second memory address and outputs the second frame of image, and so on. The read control module always lags behind by one memory address, and orderly synchronous reading and writing are kept.

Step 4: enable, during a period when the video switching instruction keeps valid, the write control module to skip back to a head address of a memory space currently written to write a frame of image in video data of a target input channel after switching into the current memory space; enable the read control module to skip back to a head address of a memory space currently read to read a frame of image in video data of a current channel before switching from the current memory space until the video switching instruction is invalid; and enable the write control module and the read control module to stop writing and reading image frames into and from respective current memory spaces, turn to respective next memory spaces to continue to write and read next image frames, and output image frames to a target output channel.

In an alternative embodiment, time when the video switching instruction keeps valid equals duration occupied by two frames of images, or duration occupied by several other frames of images. However, the time when the video switching instruction keeps valid cannot be too long. In a case of video data having a refresh rate of 60 Hz, that is, video data of which 60 image frames are refreshed and displayed in 1 s, the time when the video switching instruction keeps valid lasts for 0.033 s, which equals duration occupied by two frames of images. During such extreme time, a human eye cannot feel video switching, such that seamless video switching is achieved.

The situation that the video switching instruction is invalid means that the controller does not receive the video switching instruction or the received video switching instruction disappears. That is, the read control module and the write control module do not receive the video switching instruction. The video switching instruction is generally a level signal. In a situation that the video switching instruction keeps at a high level, the video switching instruction is valid, and the read control module and the write control module receive the video switching instruction. In a situation that the video switching instruction keeps at a low level (generally zero level), the video switching instruction is invalid, and the read control module and the write control module do not receive the video switching instruction.

For instance, at a moment before the video switching instruction is received (that is, before switching is performed), that is, when the video data is normally read and written according to step 3, the write control module is writing a second frame of image of a current channel into a second-frame memory space, and the read control module is reading a first frame of image (the first frame of image comes from video data of a current channel) into a first-frame memory space. When the video switching instruction is received (that is, when switching is performed), after writing the second frame of image into the second-frame memory space, the write control module skips back to a head address of the second-frame memory space from a tail address of the second-frame memory space to write a frame of image of a target input channel into the second-frame memory space. After reading a first frame of image of a first-frame memory space, the read control module skips back to a head address of the first-frame memory space from a tail address of the first-frame memory space to continue to read a first frame of image from the first-frame memory space until the video switching instruction is invalid (that is, after switching is performed). The write control module writes a third frame of image into a third-frame memory space. The read control module reads an image frame of the second-frame memory space from the second-frame memory space (the image frame in this situation is video data from the target input channel), and so on.

Through processing of the step, during video switching, an output image is always a complete frame of image instead of a half frame of image or a plurality of frames of images of a plurality of input channels mixed, such that the problems of black screen, image tearing, etc. during switching are avoided, and smooth seamless video switching is ensured. Moreover, the time when the video switching instruction keeps valid is extreme (generally 0.033 s) such that a human eye cannot perceive image freezing, and a human feels instantaneous switching. Thus, switching is extremely smooth.

The present application is described with reference to flow diagrams and/or block diagrams of a method, device (system) and computer program product according to examples of the present application. It should be understood that each flow and/or block in the flow diagrams and/or block diagrams and combinations of the flows and/or blocks in the flow diagrams and/or block diagrams can be implemented by means of computer program instructions. These computer program instructions can be provided for a processor of a general-purpose computer, a special-purpose computer, an embedded processor, or other programmable data processing devices to produce a machine, such that instructions executed by the processor of the computer or other programmable data processing devices produce an apparatus configured to implement specified functions in one or more flows of each flow diagram and/or one or more blocks of each block diagram.

These computer program instructions can be stored in a computer readable memory that can guide a computer or other programmable data processing devices to work in a specific manner, such that the instructions stored in the computer readable memory produce an article of manufacture including an instruction apparatus. The instruction apparatus implements specified functions in one or more flows of each flow diagram and/or one or more blocks in each block diagram.

These computer program instructions can be loaded onto a computer or other programmable data processing devices, such that a series of operations and steps are executed on the computer or other programmable devices to generate computer-implemented processing. Therefore, the instructions executed on the computer or other programmable devices provide steps for implementing specific functions in one or more flows in each flow diagram and/or one or more blocks in each block diagram.

Although the preferred examples of the present application have been described, a person skilled in the art can make additional changes and modifications to these examples once they learn the basic inventive concept. Therefore, the appended claims are intended to be interpreted as including the preferred examples and all changes and modifications falling within the scope of the present application.

Apparently, those skilled in the art can make various modifications and variations to the present application without departing from the spirit and scope of the present application. In this way, if these modifications and variations of the present application fall within the scope of the claims of the present application and their equivalent technologies, the present application is also intended to include these modifications and variations.

The invention claimed is:

1. A seamless video switching method in video matrix, comprising steps as follows:
   step 1: dividing a memory address on a memory for storing video data into several memory spaces, wherein each memory space comprises several memory addresses;
   step 2: executing step 3 under the condition that a controller does not receive a video switching instruction; or executing step 4, wherein the video switching instruction comprises target channel information, and the target channel information comprises a target input channel and a target output channel;
   step 3: enabling a write control module in the controller to receive video data of a current input channel and write the video data into the memory according to an image frame, wherein a frame of image is correspondingly stored in a memory space in the memory; enabling a read control module in the controller to read the image frame in the memory and output the image frame in a current output channel; enabling the write control module to write a next complete frame of image into a next memory space every time a complete frame of image is written; and enabling the read control module to read a complete frame of image into a next memory space after a complete frame of image of a current memory space is read; wherein a read-write sequence in which the write control module writes the video data into the memory and the read control module read the video data from the memory conforms to preset rule 1;

preset rule 1 is as follows: after the read control module and the write control module start reading and writing, in a memory address sequence, the read control module starts reading video data after the write control module writes at least a complete frame of image, and the read control module starts reading a next frame of image every time the write control module writes a complete frame of image; and the write control module starts writing a next complete frame of image every time the read control module reads a complete frame of image, such that the write control module and the read control module keep orderly synchronously reading and writing; and step 4: enabling, during a period when the video switching instruction keeps valid, the write control module to skip back to a head address of a memory space currently written to write a frame of image in video data of a target input channel after switching into the current memory space; enabling a read control module to skip back to a head address of a memory space currently read to read a frame of image from the current memory space and output an image frame to a target output channel until the video switching instruction is invalid; and enabling the write control module and the read control module to turn to respective next memory spaces to continue to write and read next image frames.

2. The seamless video switching method in video matrix according to claim 1, wherein the memory is a random access memory (RAM) or a read only memory (ROM).

3. The seamless video switching method in video matrix according to claim 1, wherein memory addresses of any two adjacent memory spaces are spaced by at least one memory address, such that the memory addresses of any two adjacent memory spaces are discontinuous.

4. The seamless video switching method in video matrix according to claim 1, wherein the video switching instruction is sent out by a channel switching device.

5. The seamless video switching method in video matrix according to claim 1, wherein time when the video switching instruction keeps valid equals duration occupied by several frames of images.

6. The seamless video switching method in video matrix according to claim 5, wherein the time when the video switching instruction keeps valid equals duration occupied by 2 frames of images.

7. The seamless video switching method in video matrix according to claim 6, wherein the time when the video switching instruction keeps valid lasts for 0.033 s.

8. The seamless video switching method in video matrix according to claim 1, wherein the video switching instruction is a level signal, and the situation that the video switching instruction keeps valid means that the video switching instruction is at a high level.

9. The seamless video switching method in video matrix according to claim 2, wherein the video switching instruction is a level signal, and the situation that the video switching instruction keeps valid means that the video switching instruction is at a high level.

10. The seamless video switching method in video matrix according to claim 3, wherein the video switching instruction is a level signal, and the situation that the video switching instruction keeps valid means that the video switching instruction is at a high level.

11. The seamless video switching method in video matrix according to claim 4, wherein the video switching instruction is a level signal, and the situation that the video switching instruction keeps valid means that the video switching instruction is at a high level.

12. The seamless video switching method in video matrix according to claim 5, wherein the video switching instruction is a level signal, and the situation that the video switching instruction keeps valid means that the video switching instruction is at a high level.

13. The seamless video switching method in video matrix according to claim 6, wherein the video switching instruction is a level signal, and the situation that the video switching instruction keeps valid means that the video switching instruction is at a high level.

14. The seamless video switching method in video matrix according to claim 7, wherein the video switching instruction is a level signal, and the situation that the video switching instruction keeps valid means that the video switching instruction is at a high level.

15. A seamless video switching system in video matrix, comprising a controller, a memory and a channel switching device, wherein the memory and the channel switching device are electrically connected to the controller;

the memory is configured to receive image frames output by the controller through an output channel, the same frame of images are stored in one memory space, and different frames of images are stored in different memory spaces;

the channel switching device is configured to send a video switching instruction to the controller, the video switching instruction comprises a target channel, and the target channel comprises a target input channel and a target output channel;

the controller comprises a read control module and a write control module, the controller is configured to receive video data input through an input channel and execute corresponding steps according to whether the video switching instruction is received, if yes, step 3 is executed, and if not, step 4 is executed;

step 3 is as follows: enabling the write control module in the controller to receive video data of a current input channel and write the video data into the memory according to an image frame, wherein a frame of image is correspondingly stored in a memory space in the memory; enabling the read control module in the controller to read the image frame in the memory and output the image frame in a current output channel; enabling the write control module to write a next complete frame of image into a next memory space every time a complete frame of image is written; and enabling the read control module to read a complete frame of image into a next memory space after a complete frame of image of a current memory space is read;

a read-write sequence in which the write control module writes the video data into the memory and the read control module read the video data from the memory conforms to preset rule 1;

preset rule 1 is as follows: after the read control module and the write control module start reading and writing, in a memory address sequence, the read control module starts reading video data after the write control module writes at least a complete frame of image, and the read control module starts reading a next frame of image every time the write control module writes a complete frame of image; and the write control module starts writing a next complete frame of image every time the read control module reads a complete frame of image, such that the write control module and the read control module keep orderly synchronously reading and writing; and step 4 is as follows: enabling, during a period when the video switching instruction keeps valid, the write control module to skip back to a head address of a memory space currently written to write a frame of image in video data of a target channel after switching into the current memory space; enabling the read control module to skip back to a head address of a memory space currently read to read a frame of image from the current memory space until the video switching instruction is invalid; and enabling the write control module and the read control module to turn to respective next memory spaces to continue to write and read next image frames.

* * * * *